United States Patent
Ramappan et al.

(10) Patent No.: US 8,316,818 B2
(45) Date of Patent: Nov. 27, 2012

(54) HCCI MODE SWITCHING CONTROL SYSTEM AND METHOD

(75) Inventors: Vijay Ramappan, Novi, MI (US); Peter Kafarnik, Eltville-Erbach (DE); Jun-Mo Kang, Ann Arbor, MI (US)

(73) Assignee: GM Global Technology Operations LLC

(*) Notice: Subject to any disclaimer, the term of this patent is extended or adjusted under 35 U.S.C. 154(b) by 798 days.

(21) Appl. No.: 12/493,554

(22) Filed: Jun. 29, 2009

(65) Prior Publication Data

US 2010/0274465 A1 Oct. 28, 2010

Related U.S. Application Data

(60) Provisional application No. 61/173,331, filed on Apr. 28, 2009.

(51) Int. Cl.
*F02B 17/00* (2006.01)
*F02B 5/00* (2006.01)
(52) U.S. Cl. ......... 123/295; 123/305; 701/104; 701/105
(58) Field of Classification Search ............... 123/295, 123/305; 701/103, 104, 105
See application file for complete search history.

(56) References Cited

U.S. PATENT DOCUMENTS

| | | | | |
|---|---|---|---|---|
| 6,336,436 B1* | 1/2002 | Miyakubo et al. | | 123/295 |
| 6,644,019 B2* | 11/2003 | Morikawa et al. | | 60/285 |
| 6,994,072 B2* | 2/2006 | Kuo et al. | | 123/295 |
| 7,128,047 B2* | 10/2006 | Kuo et al. | | 123/299 |
| 7,228,839 B2* | 6/2007 | Kuo et al. | | 123/294 |
| 7,240,659 B2* | 7/2007 | Yang | | 123/295 |
| 7,328,683 B2* | 2/2008 | Weiss et al. | | 123/299 |
| 7,669,578 B2* | 3/2010 | Yamashita et al. | | 123/295 |
| 7,963,268 B2* | 6/2011 | Kang et al. | | 123/294 |
| 2004/0194746 A1* | 10/2004 | Yamaoka et al. | | 123/90.15 |
| 2006/0016423 A1* | 1/2006 | Kuo et al. | | 123/299 |
| 2006/0174853 A1* | 8/2006 | Koopmans | | 123/295 |
| 2006/0196469 A1* | 9/2006 | Kuo et al. | | 123/305 |
| 2007/0233354 A1* | 10/2007 | Yang | | 701/104 |
| 2007/0256665 A1* | 11/2007 | Sun et al. | | 123/431 |
| 2008/0178836 A1* | 7/2008 | Yamashita et al. | | 123/295 |
| 2009/0229565 A1* | 9/2009 | Kang et al. | | 123/295 |
| 2011/0295487 A1* | 12/2011 | Ramappan et al. | | 701/103 |

* cited by examiner

*Primary Examiner* — Thomas Moulis

(57) ABSTRACT

A control system and method for operating an engine includes a transition module that commands engine control from a first homogeneous charge compression ignition (HCCI) mode to a second HCCI mode. The control system also includes a fuel delivery module that operates the engine in a stratified charge operation mode after commanding engine control from the first HCCI mode to the second HCCI mode and discontinues the stratified charge operation thereafter.

20 Claims, 7 Drawing Sheets

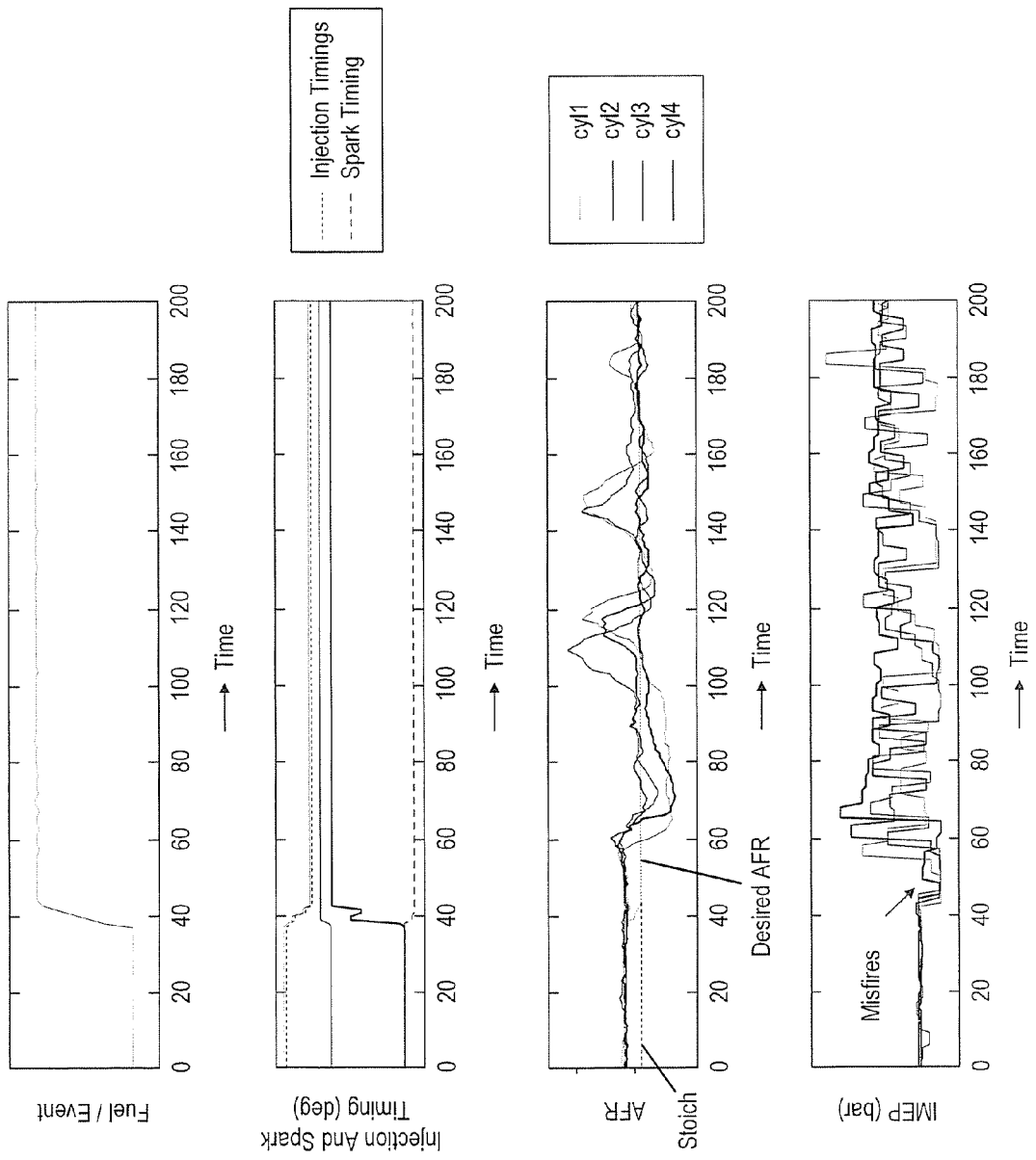

HCCI MODE SWITCHING CONTROL SYSTEM AND METHOD

CROSS-REFERENCE TO RELATED APPLICATIONS

This application claims the benefit of U.S. Provisional Application No. 61/173,331, filed on Apr. 28, 2009. The disclosure of the above application is incorporated herein by reference in its entirety.

FIELD

The present disclosure relates to engine control systems, and more particularly to engine control systems for engines operating in both spark ignition and homogenous charge compression ignition (HCCI) modes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines may be operated in a spark ignition (SI) mode and a homogeneous charge compression ignition (HCCI) mode. The HCCI mode involves compressing a mixture of fuel and an oxidizer to a point of auto-ignition. One of the modes may be selected based on engine speed and load. In the HCCI mode, ignition occurs at several locations at a time, which makes a fuel/air mixture burn nearly simultaneously. The HCCI mode performs close to an ideal Otto cycle, provides improved operating efficiency and generates lower emission levels as compared to SI mode. However since there is no direct initiator of combustion, the ignition process tends to be more difficult to control.

The HCCI mode may have various sub-modes depending on the engine speed and load. As the operation changes between the HCCI sub-modes, the engine may misfire due to sudden changes in in-cylinder fresh air due to intake/exhaust valve timing settings and the amount of fuel reforming. Misfires may increase the amount of emissions and reduce the drivability of the engine.

SUMMARY

The engine control system according to the present disclosure operates the engine in a stratified charge mode after a transition between a low load HCCI mode and a higher load HCCI mode to reduce misfires caused by the transition.

In one aspect of the disclosure, a method of controlling an engine includes commanding engine control from a first homogeneous charge compression (HCCI) mode to a second HCCI mode, entering a stratified charge operation in response to commanding changing engine control from the first HCCI mode to the second HCCI mode, discontinuing the stratified charge operation and operating the engine in the second HCCI mode after discontinuing.

In another aspect of the disclosure, a control system for an engine includes a transition module that commands engine control from a first homogeneous charge compression (HCCI) mode to a second HCCI mode. The control system also includes a fuel delivery module that operates the engine in a stratified charge operation mode after commanding engine control from the first HCCI mode to the second HCCI mode and discontinues the stratified charge operation thereafter.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 3A is a plot of fuel versus engine events for an engine not including the transition control according to the present disclosure;

FIG. 3B is a plot of injection and spark timing versus engine event for an engine not having transition control according to the present disclosure;

FIG. 3C is a plot of air fuel ratio versus engine event for an engine not having transition control according to the present disclosure;

FIG. 3D is a plot of indicated mean effective pressure (IMEP) versus engine event for an engine not having transition control according to the present disclosure;

DETAILED DESCRIPTION

Figure 1A:
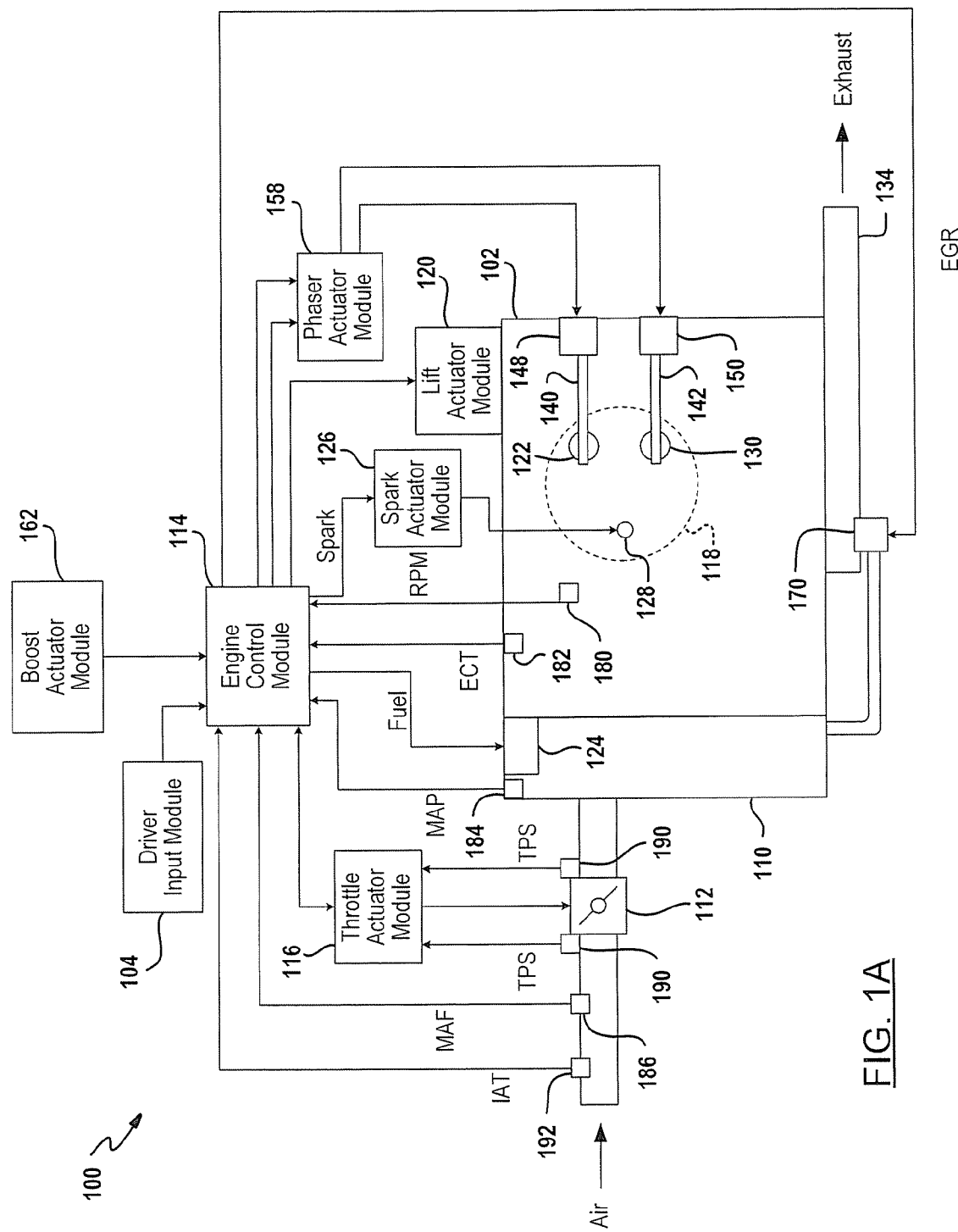
FIG. 1A is a functional block diagram of an engine control system that operates in SI and HCCI combustion modes according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The engine control system according to the present disclosure operates the gasoline engine in the SI mode and the HCCI mode. The HCCI mode reduces fuel consumption but is only available over a limited range of engine torques and speeds. For example only, the engine control system may operate the engine in the HCCI mode at low to mid loads and low to mid engine speeds. The engine control system may operate the engine in the SI mode at other loads and engine speeds. The HCCI operating region may be divided into various sub-modes or HCCI operating zones and may be defined by operating maps in calibration tables.

The engine may be a direct injection gasoline engine and may be selectively operated in a stratified operating mode during the transitions. To operate in the stratified operating mode, the fuel injectors inject a fraction of the total required fuel just before the ignition event. This approach provides a stoichiometric charge near the spark plug even though the overall environment could be lean causing the air fuel mixture to ignite easily and burn quickly and smoothly.

Transitions between the HCCI modes should appear seamless to the driver, minimize engine emissions and minimize fuel consumption losses.

The present disclosure describes control systems and methods for transitioning between the HCCI operating modes. For example only, the present disclosure describes HCCI mode transitions that employ stratified charging and timing of fuel injections relative to ignition timing.

Referring now to FIG. 1A, a functional block diagram of an exemplary engine system 100 is presented. The engine system 100 includes an engine 102 that combusts an air/fuel mixture to produce drive torque for a vehicle based on a driver input module 104. The engine may be a direct ignition engine. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The lift actuator module 120 may switch between high and low lift on their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. Additionally, the lift actuator module controls the amount of lift, which may be adjusted hydraulically or using other methods.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The ECM 114 may calculate measured air per cylinder (APC) based on the MAF signal generated by the MAF sensor 186. The ECM 114 may estimate desired APC based on engine operating conditions, operator input or other parameters.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance or retard. Other actuators include the EGR valve 170, the phaser actuator module 158, the fuel injection system 124, and the lift actuator module 120. The term actuator position with respect to these actuators may correspond to manifold absolute pressure, EGR valve opening, intake and exhaust cam phaser angles, and air/fuel ratio, respectively.

Figure 1B:
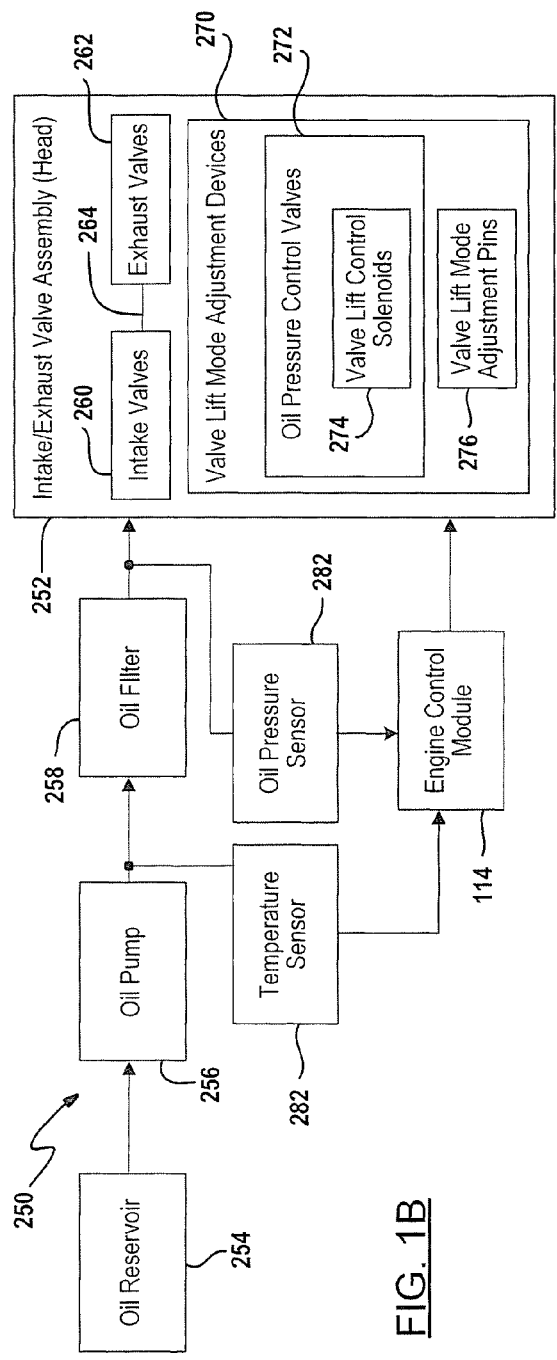
FIG. 1B is a functional block diagram of an exemplary valve lift adjustment system.

Referring now to FIG. 1B, a functional block diagram of a valve lift control circuit 250 is shown. The valve lift control circuit 250 includes an intake/exhaust valve assembly 252 that receives oil from an oil reservoir 254 via an oil pump 256. The oil is filtered through an oil filter 258 prior to reception by the valve assembly 252. The control module controls lift operation of intake and exhaust valves 260, 262 of the valve assembly 252.

The valve assembly 252 includes the intake and exhaust valves 260, 262, which have open and closed states and are actuated via one or more camshafts 264. A dedicated intake camshaft and a dedicated exhaust camshaft may be included. In another embodiment, the intake and exhaust valves 260, 262 share a common camshaft. When in an open state the intake and exhaust valves 260, 262 may be operating in various lift states.

The valve assembly 252 also includes valve lift state adjustment devices 270. The lift state adjustment devices 270 may include oil pressure control valves 272 and valve lift control valves, such as solenoids 274. Other lift state adjustment devices 276, such as lift pins, levers, rockers, springs, locking mechanisms, tappets, etc may be included.

The valve lift control circuit 250 may include an oil temperature sensor 280 and/or an oil pressure sensor 282. The control module signals the oil pressure control valves 272 based on temperature and pressure signals received from the temperature and pressure sensors 280, 282.

Figure 1C:
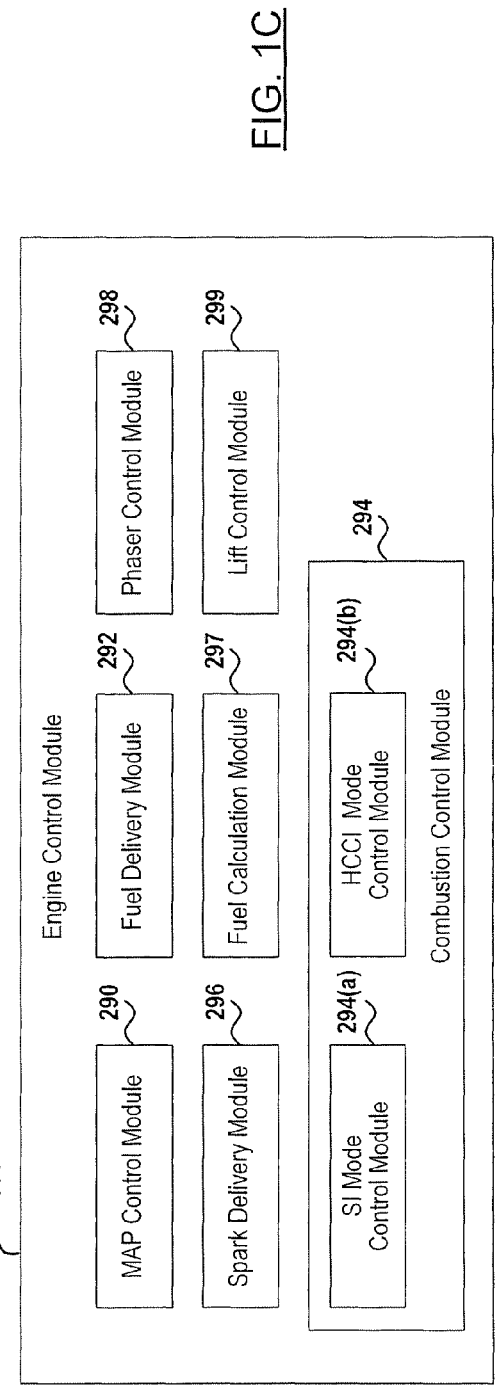
FIG. 1C is a functional block diagram of an exemplary engine control module.

Referring now to FIG. 1C, the engine control module 114 may comprise a map control module 290 having a MAP control mode (MM). The MM can be set to SI and HCCI modes. The engine control module 114 comprises a fuel delivery module 292 having a fuel delivery mode (FM). The fuel delivery module 292 may switch the FM between SI and various HCCI modes. The fuel delivery module 292 may determine the manner, timing and/or amount of fuel delivery.

The engine control module 114 comprises a combustion control module 294 having a combustion mode (CM). The combustion module 294 may switch the CM between SI, HCCI and pre-HCCI modes and include an SI control module 294(a) and an HCCI control module 294(b).

The engine control module 114 comprises a spark delivery module 296 having a spark delivery mode (SM). The spark delivery module 296 may switch the SM between SI, SI with retard, stratified and HCCI modes. The spark delivery module 296 may determine the timing and duration of spark.

The engine control module 114 comprises a fuel calculation module 297 having a fuel calculation mode (FC). The fuel calculation module 297 may switch the FC between air lead and fuel lead modes. In air lead mode, fuel is controlled based on air. In fuel lead mode, air is controlled based on the measured or delivered fuel.

The engine control module 114 comprises a phaser control module 298 having a phaser control mode (PM). The phaser control module 298 may switch the PM between SI and HCCI modes. The phaser control module 298 may determine cam phasing.

The engine control module 144 comprises a lift control module 299 having a lift control mode (LM). The lift control module 299 may switch the LM between high and low valve lift modes.

Figure 1D:
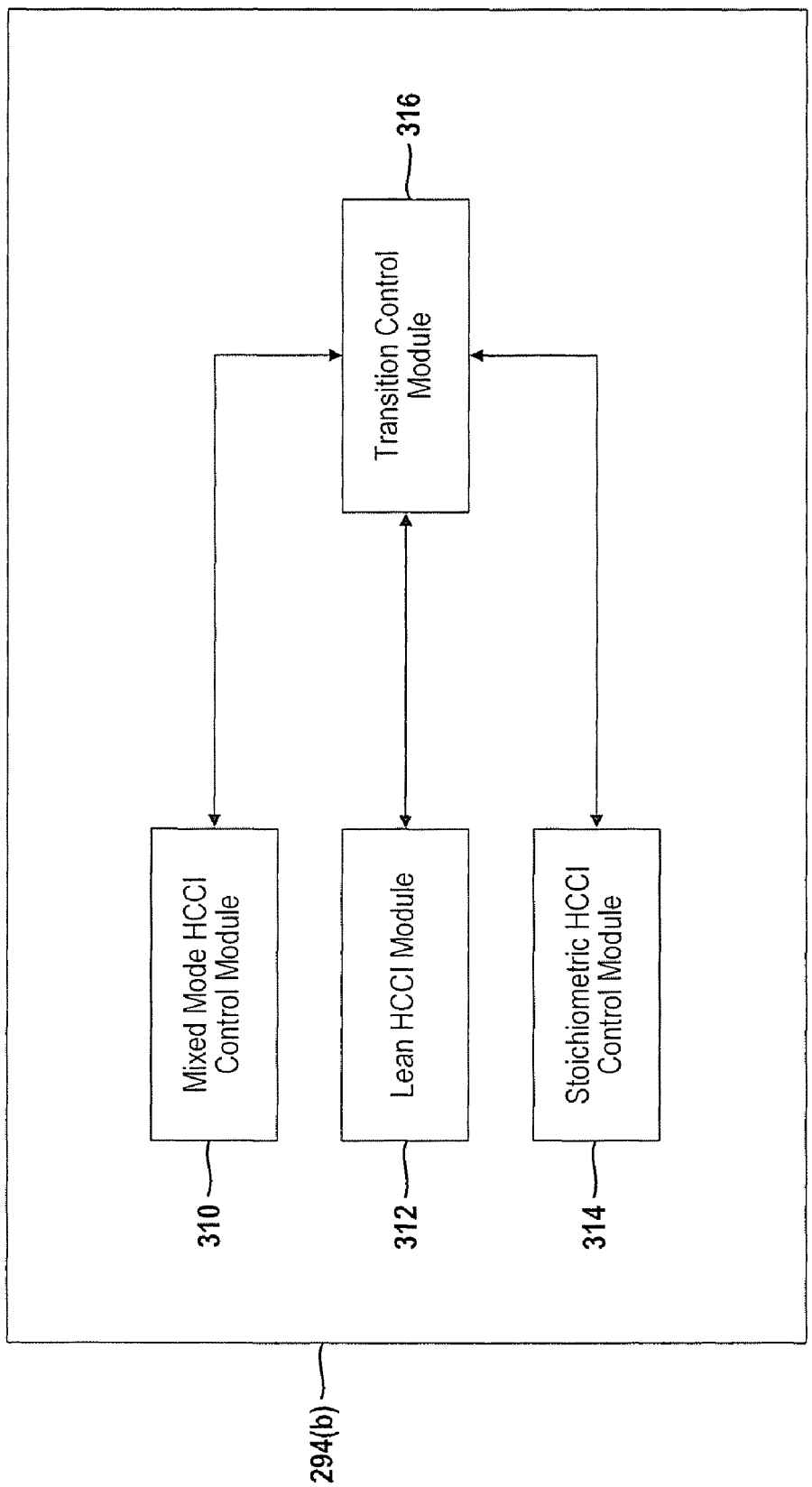
FIG. 1D is a block diagrammatic view of the HCCI mode control module 294(b) of FIG. 1 C.

Referring now to FIG. 1D, the HCCI mode control module 294(b) is illustrated in further detail. The HCCI mode control module 294(b) controls various modes within the HCCI control range. The HCCI mode control module may include a mixed mode HCCI control module 310, a lean HCCI module 312 and a stoichiometric HCCI control module 314. The mixed mode HCCI control module 310 is used to control the HCCI mixed mode which is used in a low load operating condition. The low load operating condition requires substantial fuel reforming which corresponds to early injection during a recompression cycle. In mixed mode, the exhaust valves are closed early and fuel injections are provided into the closed cylinder to increase the heat contained within the cylinder. The energy from the fuel is converted to increase the temperature within the cylinder. The lean HCCI module 312 controls the fuel injections into the cylinders in HCCI mode. In HCCI mode, the fuel is injected with single or multiple injections to provide spontaneous combustion or spark-enhanced combustion.

The stoichiometric HCCI control module 314 controls the air fuel ratio as the stoichiometric level. Stoichiometric HCCI control is used at higher loads than that of the lean HCCI mode and the mixed mode HCCI control.

A transition control module 316 is in communication with the mixed mode HCCI control module, the lean HCCI module and the stoichiometric HCCI control module. The transition control module 316 controls a transition between the mixed mode and the other modes. The transition control module 316 may, as described below, generate a stratified fuel injection before a main spark event to initiate combustion around the spark plug. This prevents misfires due to a sudden change in actuator settings that influence in-cylinder charge and because of the reduced amount of fuel reforming used in the lean HCCI mode as compared to the mixed mode HCCI mode.

Figure 2:
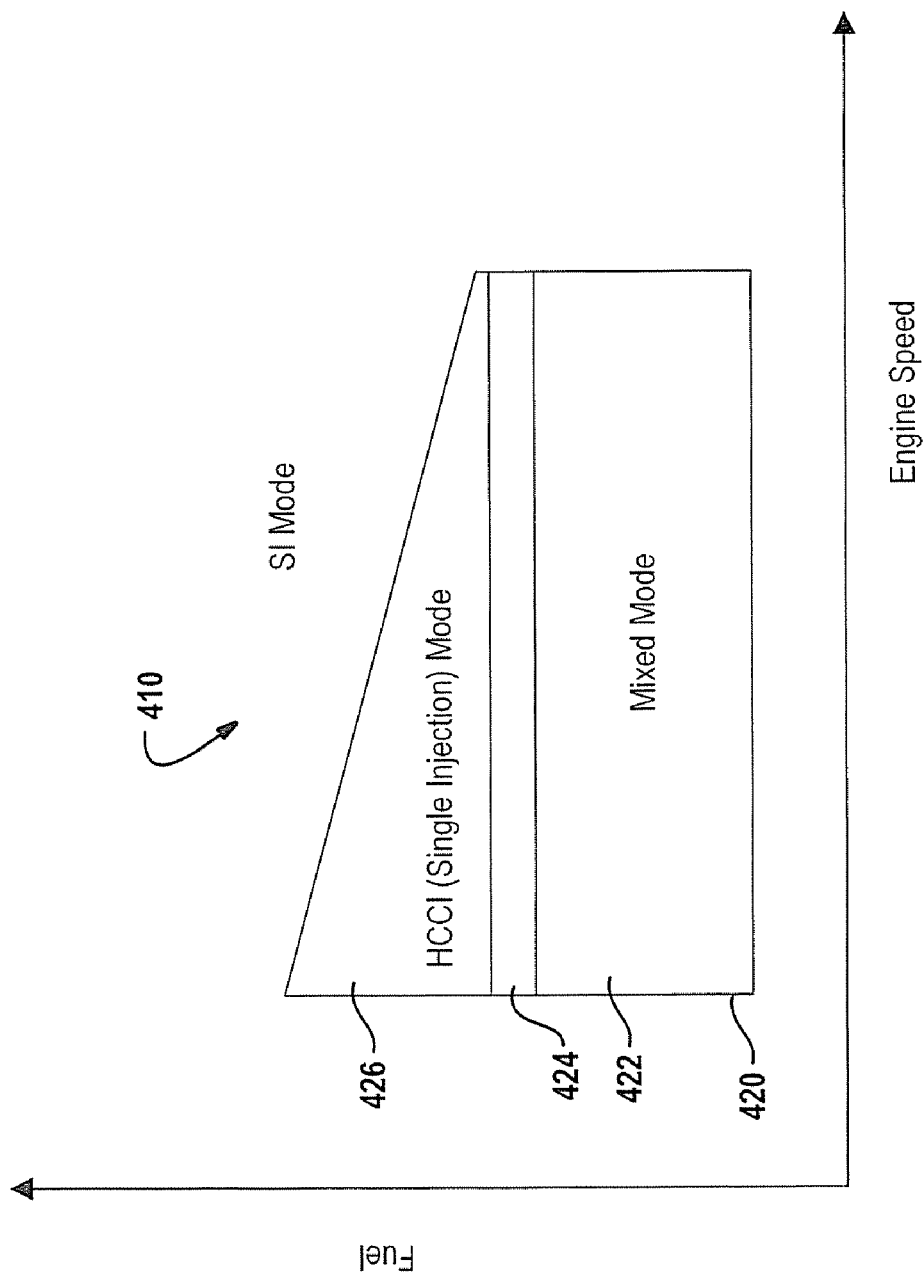
FIG. 2 is a plot of fuel versus engine speed in RPMs illustrating various HCCI modes and a spark-injected mode.

Referring now to FIG. 2, a plot of various HCCI modes is illustrated. A spark injected mode 410 uses the valves at high lift. An HCCI mode 420 uses the valves in low lift.

The HCCI operating zone 420 has a mixed mode HCCI region 422, a lean or stoichiometric HCCI region 426 and an overlap region 424. The overlap region 424 is activated when a change from mixed mode HCCI 422 to a lean or stoichiometric HCCI mode 426 is commanded. The overlap region 424 corresponds to a stratified fuel injection before a main spark event. In the overlapping region 424, the fuel is injected closer to the spark event. This allows a stratified fuel charge to take place.

The parameters for each of the HCCI mode regions may vary depending on various conditions and engine configurations.

Referring now to FIGS. 3A-3D, FIG. 3A illustrates an amount of fuel injected in a conventional control strategy from a mixed mode at low fueling level to an HCCI mode at a higher fueling level. As can be seen in FIG. 3B, the injection and spark timing are also changed. The air fuel ratio is illustrated in FIG. 3C for various cylinders. As can be seen, the air fuel ratio varies widely for the different cylinders corresponding to unpredictable operation as is illustrated in the indicated mean effective pressure (IMEP) plot of FIG. 3D. In FIG. 3D, the number of misfires over the range of engine events is substantial. During a transient between a low load and high load HCCI combustion condition, the engine misfires due to a sudden change in the actuator settings and in the amount of fuel reforming.

Figures 4A, 4B, 4C:
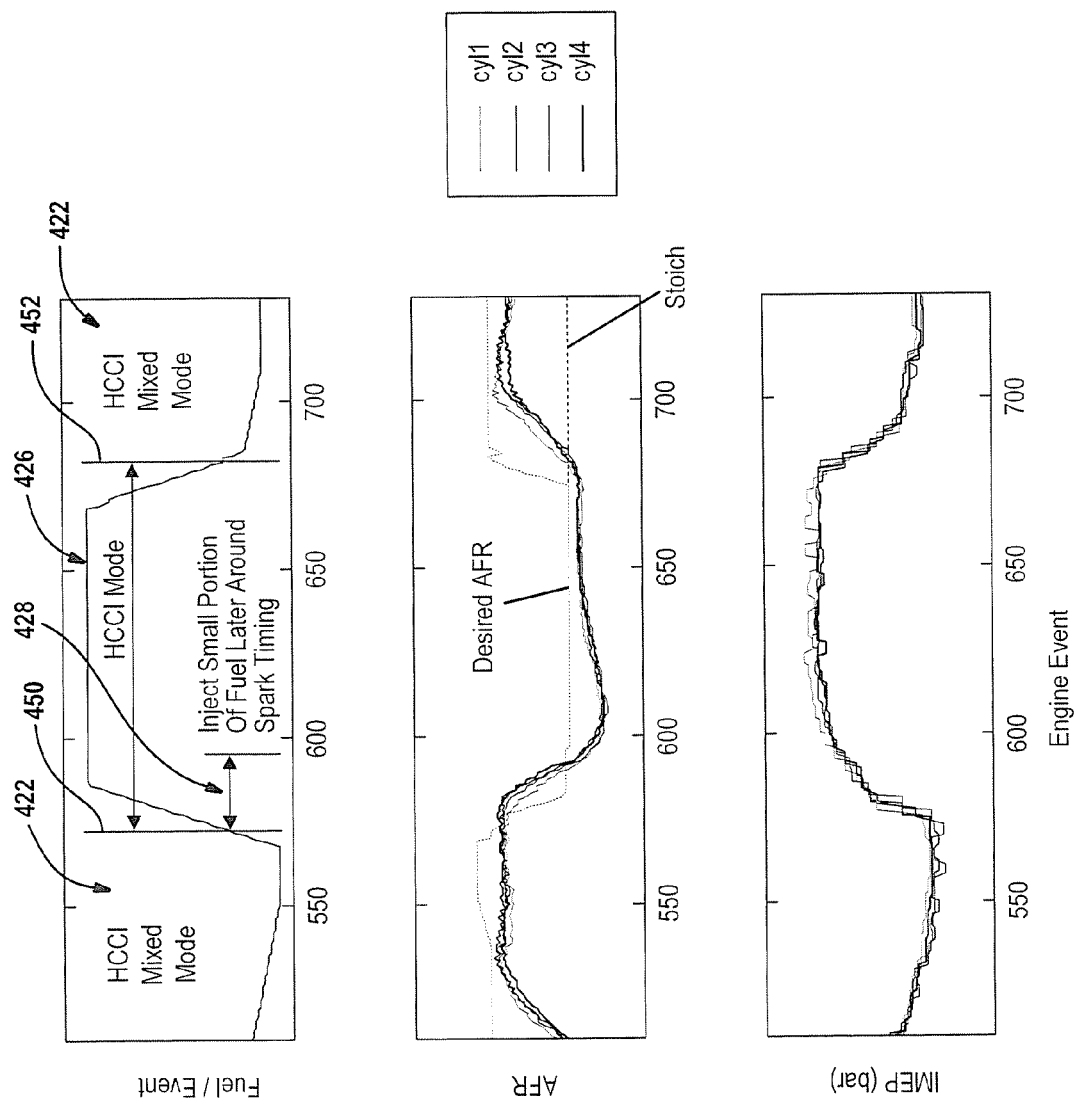
FIG. 4A is a plot of fuel versus engine event for an engine having the transition control according to the present disclosure.
FIG. 4B is a plot of air fuel ratio versus engine event for an engine having the transition control according to the present disclosure.
FIG. 4C is a plot of IMEP versus engine event for an engine having transition control according to the present disclosure.

Referring now to FIGS. 4A-4C, FIG. 4A illustrates the amount of fuel injected in a control strategy with transition control. The same reference numerals from FIG. 2 are used to illustrate the mixed mode HCCI 422 and the lean or stoichiometric HCCI mode 426. At time 450 a command for a mode change from mixed mode HCCI to lean or stoichiometric HCCI is initiated. After the command, a small portion of fuel is injected just before the spark ignition event to allow a stratified fuel charge for a time 428 defined by the Transition Control Module. At time 452 a command is initiated to change control between HCCI mode 426 and HCCI mixed mode 422.

As can be seen in FIG. 4B, the air fuel ratio is maintained evenly between the various cylinders. In FIG. 4C, the IMEP illustrates the lack of misfires in the uniformity of operation between the various cylinders.

Figure 5:
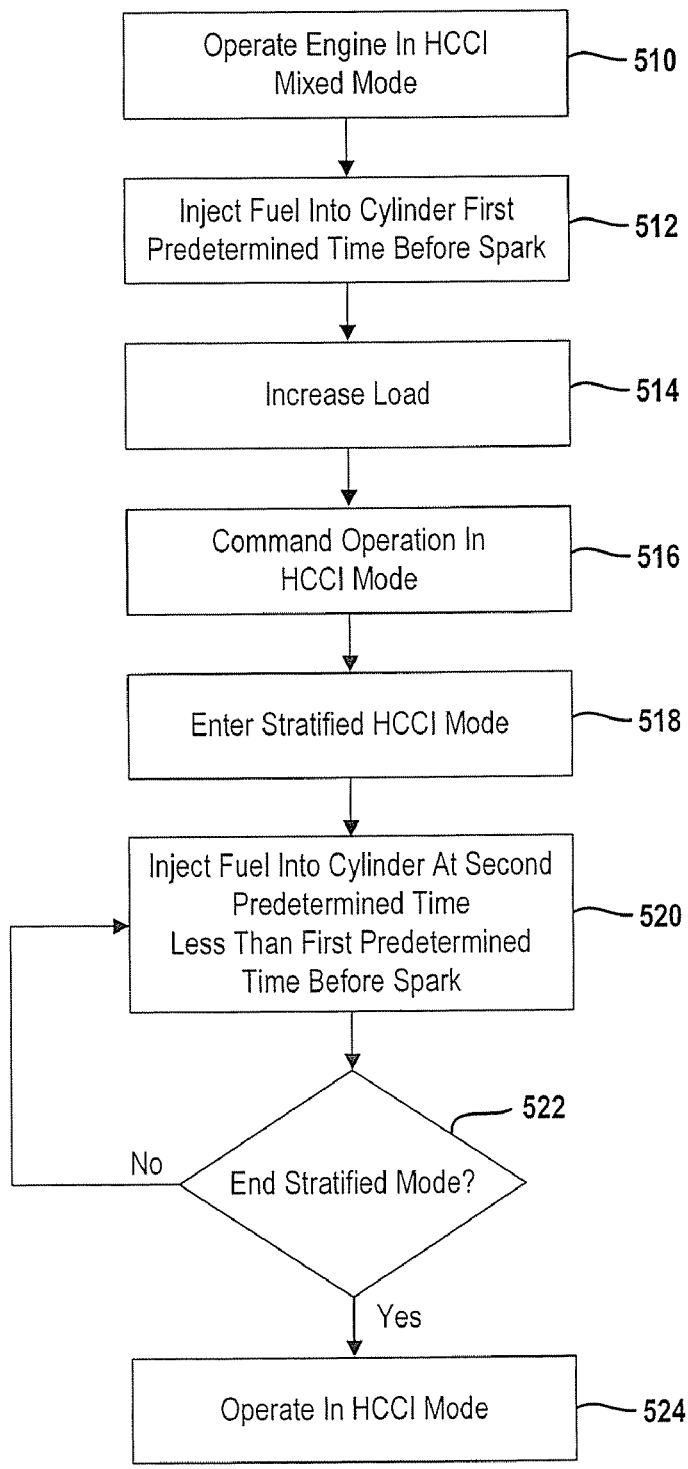
FIG. 5 is a plot of a method for controlling an engine according to the present disclosure.

Referring now to FIG. 5, the present disclosure is applicable to transitions between a first HCCI mode and a second HCCI mode. In the following example, a transition between mixed mode HCCI and lean or stoichiometric HCCI mode is used. In step 510, the engine operates in mixed mode HCCI. In step 512, a portion of fuel is injected into the cylinder at first predetermined time before the spark event in the mixed mode. In step 514, the load of the engine increases. The load may increase due to torque requests from the vehicle operator. In step 516, a command is generated by the control to change the operation into a lean or stoichiometric HCCI mode. In step 518, a stratified HCCI mode is entered such as illustrated as 424 of FIG. 2. The stratified HCCI mode injects a portion of the fuel into the cylinder at a second predetermined time before the spark event which is less than the first predetermined time before the spark event in step 512.

In step 522, if the stratified mode is not to be ended, step 520 continues injecting the fuel into the cylinder at the predetermined time before the spark event to perform the stratified mode. The stratified mode may be ended in step 522 after a predetermined time from commanding a change from the mixed mode HCCI to the lean or stoichiometric HCCI mode. Other conditions may also be monitored including the CAM timing. Thus, when the CAM timing reaches a desired value, the stratified HCCI mode may be terminated in step 522. The HCCI stratified mode is entered while low load to high load transient due to the airflow that suddenly increases when injection timing shifts and the amount of fuel reforming drastically changes. This results without transition control in immediate misfires since the CAM timing cannot change fast enough to compensate for the sudden airflow increment. Therefore, when HCCI mode transition from mixed mode HCCI is commanded, a small portion of the fuel is injected later around the spark timing event. Once the CAM timing reaches a desired value or a predetermined amount of time has passed, step 524 operates the engine in an HCCI mode.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of controlling an engine comprising:
commanding engine control from a first homogeneous charge compression ignition (HCCI) mode to a second HCCI mode;
entering a stratified charge operation in response to commanding engine control from the first HCCI mode to the second HCCI mode;
discontinuing the stratified charge operation; and
operating the engine in the second HCCI mode after discontinuing the stratified charge operation.

2. A method as recited in claim 1 wherein commanding engine control from the first HCCI mode to the second HCCI mode comprises commanding engine control from the first HCCI mode to the second HCCI mode in response to an increase in engine load.

3. A method as recited in claim 1 wherein the first HCCI mode comprises a low load HCCI mode.

4. A method as recited in claim 3 wherein the second HCCI mode comprises a second load higher than the low load.

5. A method as recited in claim 1 wherein the first HCCI mode corresponds to a first fuel injected quantity and first engine speed range.

6. A method as recited in claim 5 wherein the second HCCI mode corresponds to a second fuel quantity and the first engine speed range.

7. A method as recited in claim 1 further comprising, in the first HCCI mode, injecting fuel at a first predetermined time prior to a spark event, wherein entering the stratified charge operation comprises injection of fuel at a second predetermined time less than the first predetermined time prior to the spark event.

8. A method as recited in claim 1 wherein discontinuing the stratified charge operation comprises discontinuing the stratified charge operation after a predetermined time.

9. A method as recited in claim 1 wherein discontinuing the stratified charge operation comprises discontinuing the stratified charge operation until cam timing reaches a desired threshold.

10. A method as recited in claim 1 further comprising changing engine control from the second HCCI mode to a third HCCI mode in response to an increase in engine load.

11. A control system for an engine comprising:
a transition module that commands engine control from a first homogeneous charge compression ignition (HCCI) mode to a second HCCI mode; and
a fuel delivery module that operates the engine in a stratified charge operation mode after commanding engine control from the first HCCI mode to the second HCCI mode and discontinues the stratified charge operation thereafter.

12. A control system as recited in claim 11 wherein the transition module commands engine control from the first HCCI mode to the second HCCI mode in response to an increase in engine load.

13. A control system as recited in claim 11 further comprising a mixed mode HCCI module that operates the engine in the first HCCI mode under a low engine load.

14. A control system as recited in claim 13 further comprising a lean or stoichiometric HCCI module that operates the engine in the second HCCI mode after the first HCCI mode under an engine load higher than the low engine load.

15. A control system as recited in claim 11 wherein the first HCCI mode corresponds to a first injected fuel quantity and a first engine speed range.

16. A control system as recited in claim 15 wherein the second HCCI mode corresponds to a second injected fuel quantity and the first engine speed range.

17. A control system as recited in claim 11 wherein, in the first HCCI mode, the fuel delivery module controls injection at a first predetermined time prior to a spark event and wherein, in the stratified charge operation mode, the fuel delivery module injects fuel at a second predetermined time less than the first predetermined time prior to the spark event.

18. A control system as recited in claim 11 wherein the transition module discontinues the stratified charge operation after a predetermined time.

19. A control system as recited in claim 11 wherein the transition module discontinues the stratified charge operation until cam timing reaches a desired threshold.

20. A control system as recited in claim 11 further comprising an HCCI mode control module that changes engine control from the second HCCI mode to a third HCCI mode in response to an increase in engine load.

* * * * *